United States Patent
Kerr et al.

(10) Patent No.: US 9,501,786 B1
(45) Date of Patent: Nov. 22, 2016

(54) INTERACTIVE DISPLAY SYSTEM

(75) Inventors: Michael A. Kerr, Reno, NV (US); David Stewart, Stateline, NV (US)

(73) Assignee: NEXRF, CORP., Reno, NV (US)

(*) Notice: Subject to any disclaimer, the term of this patent is extended or adjusted under 35 U.S.C. 154(b) by 82 days.

(21) Appl. No.: 13/251,699

(22) Filed: Oct. 3, 2011

Related U.S. Application Data

(63) Continuation-in-part of application No. 13/218,256, filed on Aug. 25, 2011, which is a continuation-in-part of application No. 13/153,214, filed on Jun. 3, 2011, which is a continuation-in-part of application No. 13/153,238, filed on Jun. 3, 2011, now Pat. No. 9,408,032, which is a continuation-in-part of application No. 13/153,248, filed on Jun. 3, 2011, which is a continuation-in-part of application No. 12/821,852, filed on Jun. 23, 2010, now Pat. No. 8,738,024, which is a continuation-in-part of application No. 12/413,547, filed on Mar. 28, 2009, now Pat. No. 8,942,995, which is a continuation-in-part of application No. 11/948,007, filed on Nov. 30, 2007, now Pat. No. 9,373,116.

(60) Provisional application No. 61/427,753, filed on Dec. 28, 2010, provisional application No. 61/427,755, (Continued)

(51) Int. Cl.
 *G06Q 30/00* (2012.01)
 *G06Q 30/02* (2012.01)

(52) U.S. Cl.
 CPC .................. *G06Q 30/0267* (2013.01)

(58) Field of Classification Search
 CPC .................................. G06Q 30/0267
 USPC .......................................... 705/14.64
 See application file for complete search history.

(56) References Cited

U.S. PATENT DOCUMENTS 4,339,798 A 7/1982 Hedges et al.
4,856,787 A 8/1989 Itkis
(Continued)

FOREIGN PATENT DOCUMENTS

FI WO2008065257 A1 6/2008
JP 2004289828 A * 10/2004
(Continued)

OTHER PUBLICATIONS

"Internet Industry Interacting Gambling Code: A Code for Industry Co-Regulation in the Area of Internet Gambling Content Pursuant to the Requirements of the Interactive Gaming Act of 2001". Internet Industry Association. Dec. 2001.
(Continued)

*Primary Examiner* — James A Reagan
(74) *Attorney, Agent, or Firm* — Michael A. Kerr; Kerr IP Group, LLC

(57) ABSTRACT

An interactive display system is described. The interactive display system comprises a display, a server and a wireless handset communicatively coupled to a wide area network. The system further comprises at least one transmitter configured to transmit a signal. The wireless handset is configured to receive a signal from the at least one transmitter and send signal strength information for the at least one transmitter to the server. The server is configured to determine whether the wireless handset is within a predefined viewing area of the display. The display is configured to present a content item when the wireless handset is within the predefined viewing area.

22 Claims, 10 Drawing Sheets

Figure 1

Related U.S. Application Data filed on Dec. 28, 2010, provisional application No. 61/454,664, filed on Mar. 21, 2011, provisional application No. 61/472,054, filed on Apr. 5, 2011, provisional application No. 61/482,834, filed on May 5, 2011, provisional application No. 61/376,936, filed on Aug. 25, 2010, provisional application No. 61/351,677, filed on Jun. 4, 2010, provisional application No. 61/351,770, filed on Jun. 4, 2010, provisional application No. 61/352,242, filed on Jun. 7, 2010, provisional application No. 61/223,565, filed on Jul. 7, 2009, provisional application No. 61/040,661, filed on Mar. 29, 2008, provisional application No. 60/872,351, filed on Nov. 30, 2006.

(56) References Cited

U.S. PATENT DOCUMENTS

| | | |
|---|---|---|
| 5,586,937 A | 12/1996 | Menashe |
| 5,594,491 A | 1/1997 | Hodge et al. |
| 5,630,757 A | 5/1997 | Gagin et al. |
| 5,643,086 A | 7/1997 | Alcorn et al. |
| 5,738,583 A | 4/1998 | Comas et al. |
| 5,761,416 A | 6/1998 | Mandal et al. |
| 5,761,647 A | 6/1998 | Boushy |
| 5,762,552 A | 6/1998 | Vuong et al. |
| 5,768,382 A | 6/1998 | Schneier et al. |
| 5,779,545 A | 7/1998 | Berg et al. |
| 5,800,268 A | 9/1998 | Molnick |
| 5,851,149 A | 12/1998 | Xidos et al. |
| 5,871,398 A | 2/1999 | Schneier et al. |
| 5,902,983 A | 5/1999 | Crevelt et al. |
| 5,947,821 A | 9/1999 | Stone |
| 5,971,849 A | 10/1999 | Falciglia |
| 6,001,016 A | 12/1999 | Walker et al. |
| 6,010,404 A | 1/2000 | Walker et al. |
| 6,106,396 A | 8/2000 | Alcorn et al. |
| 6,142,876 A | 11/2000 | Cumbers |
| 6,159,095 A | 12/2000 | Frohm et al. |
| 6,178,510 B1 | 1/2001 | O'Connor et al. |
| 6,203,428 B1 | 3/2001 | Giobbi et al. |
| 6,259,405 B1 | 7/2001 | Stewart et al. |
| 6,322,446 B1 | 11/2001 | Yacenda |
| 6,327,535 B1 | 12/2001 | Evans et al. |
| 6,409,602 B1 | 6/2002 | Wiltshire et al. |
| 6,500,068 B2 | 12/2002 | Walker et al. |
| 6,508,709 B1 | 1/2003 | Karmarkar |
| 6,508,710 B1 | 1/2003 | Paravia et al. |
| 6,527,638 B1 | 3/2003 | Walker et al. |
| 6,554,705 B1 | 4/2003 | Cumbers |
| 6,575,834 B1 | 6/2003 | Lindo |
| 6,606,494 B1 | 8/2003 | Arpee et al. |
| 6,612,928 B1 | 9/2003 | Bradford et al. |
| 6,628,939 B2 | 9/2003 | Paulsen |
| 6,638,170 B1 | 10/2003 | Crumby |
| 6,640,218 B1 | 10/2003 | Golding et al. |
| 6,676,522 B2 | 1/2004 | Rowe |
| 6,682,421 B1 | 1/2004 | Rowe et al. |
| 6,702,672 B1 | 3/2004 | Angell et al. |
| 6,709,333 B1 | 3/2004 | Bradford et al. |
| 6,709,631 B2 | 3/2004 | Mori et al. |
| 6,719,631 B1 | 4/2004 | Tulley et al. |
| 6,749,512 B2 | 6/2004 | MacGregor et al. |
| 6,782,253 B1 | 8/2004 | Shteyn et al. |
| 6,834,195 B2 | 12/2004 | Brandenberg et al. |
| 6,875,110 B1 | 4/2005 | Crumby |
| 6,879,838 B2 | 4/2005 | Rankin et al. |
| 6,884,162 B2 | 4/2005 | Raverdy et al. |
| 6,942,574 B1 | 9/2005 | LeMay et al. |
| 7,035,651 B2 | 4/2006 | Schreiner et al. |
| 7,076,243 B2 | 7/2006 | Parupudi et al. |
| 7,107,245 B1 | 9/2006 | Kowalick |
| 7,136,915 B2 | 11/2006 | Rieger, III |
| 7,196,662 B2 | 3/2007 | Misikangas et al. |
| 7,209,752 B2 | 4/2007 | Myllymaki et al. |
| 7,213,048 B1 | 5/2007 | Parupudi et al. |
| 7,218,941 B1 | 5/2007 | Kubo et al. |
| 7,228,136 B2 | 6/2007 | Myllymaki et al. |
| 7,299,059 B2 | 11/2007 | Misikangas et al. |
| 7,338,372 B2 | 3/2008 | Morrow et al. |
| 7,341,522 B2 | 3/2008 | Yamagishi |
| 7,349,683 B2 | 3/2008 | Misikangas et al. |
| 7,359,714 B2 | 4/2008 | Parupudi et al. |
| 7,397,424 B2 | 7/2008 | Houri |
| 7,450,954 B2 | 11/2008 | Randall |
| 7,493,565 B2 | 2/2009 | Parupudi et al. |
| 7,529,639 B2 | 5/2009 | Rasanen et al. |
| 7,534,169 B2 | 5/2009 | Amaitis et al. |
| 7,611,407 B1 | 11/2009 | Itkis et al. |
| 7,753,772 B1 | 7/2010 | Walker et al. |
| 8,002,617 B1 | 8/2011 | Uskela et al. |
| 8,029,349 B2 | 10/2011 | Lind |
| 8,172,684 B2 | 5/2012 | Adiraju et al. |
| 8,403,755 B2 | 3/2013 | Kerr |
| 8,506,406 B2 | 8/2013 | Kerr |
| 8,506,407 B2 | 8/2013 | Kerr |
| 8,523,679 B2 | 9/2013 | Kerr |
| 8,738,024 B1 | 5/2014 | Kerr et al. |
| 8,747,229 B2 | 6/2014 | Kerr |
| 8,942,995 B1 | 1/2015 | Kerr |
| 9,043,222 B1 | 5/2015 | Kerr et al. |
| 2001/0004768 A1 | 6/2001 | Hodge et al. |
| 2001/0005908 A1 | 6/2001 | Hodge et al. |
| 2001/0036224 A1 | 11/2001 | Demello et al. |
| 2001/0039210 A1 | 11/2001 | St-Denis |
| 2001/0044337 A1 | 11/2001 | Rowe et al. |
| 2002/0002073 A1 | 1/2002 | Montgomery et al. |
| 2002/0007494 A1 | 1/2002 | Hodge |
| 2002/0056125 A1 | 5/2002 | Hodge et al. |
| 2002/0056143 A1 | 5/2002 | Hodge et al. |
| 2002/0069105 A1 | 6/2002 | Botelho et al. |
| 2002/0077130 A1 | 6/2002 | Owensby |
| 2002/0077167 A1 | 6/2002 | Merari |
| 2002/0091568 A1 | 7/2002 | Kraft et al. |
| 2002/0103028 A1 | 8/2002 | Carter et al. |
| 2002/0111210 A1 | 8/2002 | Luciano et al. |
| 2002/0111907 A1 | 8/2002 | Ling |
| 2002/0133707 A1 | 9/2002 | Newcombe |
| 2002/0142815 A1 | 10/2002 | Candelore |
| 2002/0142844 A1 | 10/2002 | Kerr |
| 2002/0142846 A1 | 10/2002 | Paulsen |
| 2002/0144151 A1 | 10/2002 | Shell et al. |
| 2002/0174436 A1 | 11/2002 | Wu et al. |
| 2002/0198775 A1 | 12/2002 | Ryan |
| 2003/0009385 A1 | 1/2003 | Tucciarone et al. |
| 2003/0030666 A1* | 2/2003 | Najmi .............. G06F 3/0482 715/745 |
| 2003/0032409 A1 | 2/2003 | Hutcheson et al. |
| 2003/0064805 A1 | 4/2003 | Wells |
| 2003/0119578 A1 | 6/2003 | Newson |
| 2003/0144017 A1 | 7/2003 | Inselberg |
| 2004/0023721 A1 | 2/2004 | Giobbi |
| 2004/0192438 A1 | 9/2004 | Wells et al. |
| 2004/0224757 A1 | 11/2004 | Yamamura et al. |
| 2005/0046608 A1 | 3/2005 | Schantz et al. |
| 2005/0048990 A1 | 3/2005 | Lauriol |
| 2005/0085257 A1* | 4/2005 | Laird .............. A61B 5/04 455/550.1 |
| 2005/0114212 A1 | 5/2005 | Carrez et al. |
| 2005/0136949 A1 | 6/2005 | Barnes, Jr. |
| 2005/0154646 A1 | 7/2005 | Chermesino |
| 2005/0159883 A1 | 7/2005 | Humphries et al. |
| 2005/0181804 A1 | 8/2005 | Misikangas et al. |
| 2005/0246334 A1 | 11/2005 | Tao et al. |
| 2005/0261063 A1 | 11/2005 | Boyd et al. |
| 2006/0003830 A1 | 1/2006 | Walker et al. |
| 2006/0004627 A1 | 1/2006 | Baluja |
| 2006/0058102 A1 | 3/2006 | Nguyen et al. |
| 2006/0063575 A1 | 3/2006 | Gatto et al. |
| 2006/0125693 A1 | 6/2006 | Recker |
| 2006/0181411 A1 | 8/2006 | Fast et al. |
| 2006/0189382 A1 | 8/2006 | Muir et al. |
| 2006/0194633 A1 | 8/2006 | Paulsen |

(56) References Cited

U.S. PATENT DOCUMENTS

| | | |
|---|---|---|
| 2006/0238382 A1 | 10/2006 | Kimchi et al. |
| 2006/0240891 A1 | 10/2006 | Klinkhammer et al. |
| 2006/0287810 A1 | 12/2006 | Sadri et al. |
| 2007/0008108 A1 | 1/2007 | Schurig et al. |
| 2007/0024580 A1 | 2/2007 | Sands et al. |
| 2007/0025265 A1 | 2/2007 | Porras et al. |
| 2007/0060306 A1 | 3/2007 | Amaitis et al. |
| 2007/0087834 A1 | 4/2007 | Moser et al. |
| 2007/0100963 A1 | 5/2007 | Ban et al. |
| 2007/0136132 A1 | 6/2007 | Weiser et al. |
| 2007/0149215 A1 | 6/2007 | Misikangas |
| 2007/0149216 A1 | 6/2007 | Misikangas |
| 2007/0167210 A1 | 7/2007 | Kelly et al. |
| 2007/0168127 A1 | 7/2007 | Zaruba et al. |
| 2007/0184852 A1 | 8/2007 | Johnson et al. |
| 2007/0218975 A1 | 9/2007 | Iddings et al. |
| 2007/0243925 A1 | 10/2007 | LeMay et al. |
| 2007/0244633 A1 | 10/2007 | Phillips et al. |
| 2007/0257831 A1 | 11/2007 | Mathews et al. |
| 2007/0270212 A1 | 11/2007 | Cockerille et al. |
| 2007/0281692 A1 | 12/2007 | Bucher et al. |
| 2008/0026844 A1 | 1/2008 | Wells |
| 2008/0032705 A1 | 2/2008 | Patel et al. |
| 2008/0039192 A1 | 2/2008 | Laut |
| 2008/0057894 A1 | 3/2008 | Aleksic et al. |
| 2008/0076572 A1 | 3/2008 | Nguyen et al. |
| 2008/0085692 A1 | 4/2008 | Hart et al. |
| 2008/0096659 A1 | 4/2008 | Kreloff et al. |
| 2008/0097858 A1 | 4/2008 | Vucina et al. |
| 2008/0102947 A1 | 5/2008 | Hays et al. |
| 2008/0108430 A1 | 5/2008 | Evans |
| 2008/0113785 A1 | 5/2008 | Alderucci et al. |
| 2008/0153515 A1 | 6/2008 | Mock et al. |
| 2008/0162037 A1 | 7/2008 | Hasan |
| 2008/0166973 A1 | 7/2008 | Hart et al. |
| 2008/0167106 A1 | 7/2008 | Lutnick et al. |
| 2008/0186234 A1 | 8/2008 | Alles et al. |
| 2008/0189360 A1 | 8/2008 | Kiley et al. |
| 2008/0207296 A1 | 8/2008 | Lutnick et al. |
| 2008/0227473 A1 | 9/2008 | Haney |
| 2008/0249833 A1 | 10/2008 | Ali et al. |
| 2008/0252527 A1* | 10/2008 | Garcia .................. G01S 1/68 342/450 |
| 2008/0281668 A1 | 11/2008 | Nurminen |
| 2009/0018929 A1 | 1/2009 | Weathers |
| 2009/0150217 A1 | 6/2009 | Luff |
| 2009/0197684 A1 | 8/2009 | Arezina et al. |
| 2009/0213771 A1 | 8/2009 | Celentano et al. |
| 2009/0214036 A1 | 8/2009 | Shen et al. |
| 2009/0298513 A1 | 12/2009 | Hampel et al. |
| 2010/0022308 A1 | 1/2010 | Hartmann et al. |
| 2010/0027521 A1 | 2/2010 | Huber et al. |
| 2010/0039929 A1 | 2/2010 | Cho et al. |
| 2010/0048242 A1 | 2/2010 | Rhoads et al. |
| 2010/0063854 A1 | 3/2010 | Purvis et al. |
| 2010/0121567 A1 | 5/2010 | Mendelson |
| 2010/0167771 A1 | 7/2010 | Raghothaman et al. |
| 2010/0179885 A1 | 7/2010 | Fiorentino |
| 2010/0280960 A1 | 11/2010 | Ziotopoulos et al. |
| 2010/0287033 A1 | 11/2010 | Mathur |
| 2010/0302056 A1 | 12/2010 | Dutton et al. |
| 2010/0305855 A1 | 12/2010 | Dutton et al. |
| 2010/0331016 A1 | 12/2010 | Dutton et al. |
| 2011/0078167 A1 | 3/2011 | Sundaresan et al. |
| 2011/0103360 A1 | 5/2011 | Ku et al. |
| 2012/0115512 A1 | 5/2012 | Grainger et al. |
| 2012/0122476 A1 | 5/2012 | Lee et al. |
| 2013/0003572 A1 | 1/2013 | Kim et al. |

FOREIGN PATENT DOCUMENTS

| | | |
|---|---|---|
| JP | 2009025019 A | 2/2009 |
| WO | 2008065257 A1 | 6/2008 |

OTHER PUBLICATIONS

Wirelss Network. Wikipedia. http://en.wikipedia.org/wiki/Wireless_network. Nov. 17, 2008.

"Tracking Cookie." Wikipedia. http://en.wikipedia.org/wiki/Tracking_cookie. May 24, 2009.

Blom et al. "Transmission Power Measurements for Wireless Sensor Nodes and their Relationship to Battery Level." Symposium on Wireless Communication Systems. pp. 342-345, Sep. 7, 2005.

"Wi-Fi Location-Based Services—Design and Deployment Considerations." 2006 Cisco Systems. Accessed Dec. 2008. https://learningnetwork.cisco.com/docs/DOC-3418.

"Location in SIP/IP Core Architecture." Open Mobile Alliance. Sep. 4, 2008. Accessed Dec. 2008. http://www.openmobilealliance.org/technical/release_program/locsip_archive.aspx.

Want et al. "The Active Badge Location System." ACM Transactions on Office Information Systems (TOIS) vol. 10. No. 1, pp. 91-102, Jan. 1992.

Youssef et al. "Location-Clustering Techniques for WLAN Location Determination Systems." 2006. http://wrc.ejust.edu.eg/papers/ijca.pdf.

Vegni et al. "Local Positioning Services on IEEE 802.11 Networks." Radio Engineering, pp. 42-47, vol. 17, No. 2, Jun. 2008.

Ladd et al. "On the Feasibility of Using Wireless Ethernet for Indoor Localization." IEEE Transactions on Robotics and Automation, pp. 555-559, vol. 20, Issue 3, No. 3, Jun. 2004.

Ladd et al. "Using Wireless Ethernet for Localization." IEEE/RJS International Conference on Intelligent Robots and Systems. 2002.

Kitasuka et al. "Positioning Technique of Wireless LAN Terminal Using RSSI between Terminals". Jun. 2005. Accessed Dec. 2008. http://www.techrepublic.com/whitepapers/positioning-technique-of-wireless-lan-terminal-susing-rssi-between-terminals/330959.

Lafargue, Edouard. "Wireless Network Audits using Open Source Tools". SANS Institute 2003. Accessed Dec. 2008. http://www.sans.org/reading_room/whitepapers/auditing/wireless-network-audits-open-source-tools_1235.

Heidari, Mohannad. "A Testbed for Real-Time Performance Evaluation of RSS-Based Indoor Geolocation Systems in a Laboratory Environment". Apr. 21, 2005. Accessed Dec. 2008. https://www.wpi.edu/Pubs/ETD/Available/etd-050407-112549/unrestricted/massad.pdf.

Li et al. "A New Method for Yielding a Database of Location Fingerprints in WLAN" IEE Communications Proceedings, pp. 580-586, vol. 152, Issue 5, Oct. 7, 2005.

Sakata et al. "An efficient algorithm for Kriging approximation and optimization with large-scale sampling data". Computer Methods in Applied Mechanics and Engineering. vol. 193, Issues 3-5, pp. 385-404, Jan. 23, 2004.

Muthukrishnan, et al. "Sensing motion using spectral and spatial analysis of WLAN RSSI." Proceedings of the 2nd European conference on Smart sensing and context. 2007. pp. 62-76.

Capkun et al. "Mobility Helps Peer-to-Peer Security." IEEE Transactions on Mobile Computing. vol. 5, Issue 1, pp. 43-51, Jan. 2006.

Milojicic et al. "Peer-to-Peer Computing" Jul. 10, 2002. https://www.hpl.hp.com/techreports/2002/HPL-2002-57R1.pdf.

"The New Normal of Retailing: The Rise of the Mobile Shopper." Next Generation Retail Summit. 2010. http://www.ngrsummit.com/media/whitepapers/Microsoft_NGRUS.pdf.

Lamarca et al. "Place Lab: Positioning Using Radio Beacons in the Wild." Pervasive 2005, LNCS 3468, pp. 116-133, 2005.

Borriello et al. "Delivering Real-World Ubiquitous Location Systems." Communications of the ACM. pp. 36-41, vol. 48, Issue 3, Mar. 2005.

Schilit et al. "Challenge: Ubiquitous Location-Aware Computing and the "Place Lab" Initiative." WMASH Proceedings of the 1st ACM International Workshop on Wireless Mobile Applications and Services on WLAN Hotspots. 2003.

Hightower et al. "Practical Lessons from the Place Lab." IEEE Pervasive Computing. pp. 32-39, vol. 5, Issue 3, Jul.-Sep. 2006.

Hile et al. "Indoor Location Estimation with Placelab." http://www.cs.washington.edu/education/courses/cse590gb/04wi/projects/hile-liu/. Jan. 8, 2004. Accessed on Sep. 25, 2008.

(56) References Cited

OTHER PUBLICATIONS

Kang "Extracting Places from Traces of Locations." ACM SIGMOBILE Mobile Computing and Communications Review. vol. 9, Issue 3, Jul. 2005.
Lamarca et al. "Self-Mapping in 802.11 Location Systems." UbiComp 2005: Ubiquitous Computing Lecture Notes in Computer Science, 2005, vol. 3660/2005, 903, DOI: 10.1007111551201__6.
Otsason et al. "Accurate GSM Indoor Localization." Ubiquitous Computing 2005, LNCS 3660, pp. 141-158, 2005.
Varshavsky et al. "Are GSM Phones THE Solution for Localization?" 7th IEEE Workshop on Mobile Computing Systems and Applications, 2006. pp. 34-42, Aug. 1, 2005.
Chawathe et al. "A Case Study in Building Layered DHT Applications." Proceedings of the 2005 conference on Applications, technologies, architectures, and protocols for computer communications. vol. 35, Issue 4, Oct. 2005.
Lamarca et al. "Finding Yourself: Experimental location technology relies on Wi-Fi and cellphone signals instead of orbiting satellites." Dec. 2004. http://spectrum.ieee.org/computing/networks/finding-yourself.
Letchner et al. "Large-Scale Localization from Wireless Signal Strength." In Proceedings of the National Conference on Artificial Intelligence (AAAI), 2005.
Welbourne et al. "Mobile Context Inference Using Low-Cost Sensors." Location and Context-Awareness Lecture Notes in Computer Science, 2005, vol. 3479/2005, pp. 95-127.
Balakrishnan et al. "Lessons from Developing and Deploying the Cricket Indoor Location System." Nov. 7, 2003. http://www.sds.lcs.mit.edu/projects/cricket/V1Exp.pdf.
Cheng et al. "Accuracy Characterization for Metropolitan-scale Wi-Fi Localization." Proceedings of the 3rd international conference on Mobile systems, applications, and services. 2005.
"Ekahau Positioning Engine 4.2." 2008. http://www.nowire.se/images/produktblad/ekahau/datasheet_epe__42__en__11022008__lo.pdf. Sep. 29, 2008.
"Internet Industry Interacting Gambling Code: A Code for Industry Co-Regulation in the Area of Internet Gambling Content Pursuant to the Requirements of the Interactive Gambling Act 2001." Internet Industry Association. Dec. 2001.
"Wireless Network." Wikipedia. http://en.wikipedia.org/wiki/Wireless.sub.--network. Nov. 17, 2008.
Chen et al. "Practical Metropolitan-Scale Positioning for GSM Phone." UbiComp 2006: Ubiquitous Computing Lecture Notes in Computer Science, 2006, vol. 4206/2006, pp. 225-242.
HTTP Cookie, redirected from tracking cookie as downloaded from wikipedia, 41 pages.
Lafargue, Edouard. "Wireless Network Audits using Open Source Tools". SANS Institute 2003. Accessed Dec. 2008. http://www.sans.org/reading.sub.--room/whitepapers/auditing/wireless-netw-ork-audits-open-source-tools.sub.--1235.
Lamarca et al. "Self-Mapping in 802.11 Location Systems." UbiComp 2005: Ubiquitous Computing Lecture Notes in Computer Science, 2005, vol. 3660/2005, 903, DOI: 10.1007/11551201.sub.--6.
Wireless Network as downloaded from wikipedia.com, pages, 5 pages.

\* cited by examiner

| | |
|---|---|
| Content Item | Women's Clothing Sales ▼ |
| | 10% off all boots |
| | Men's Clothing Sales |
| | Running Shoe Guide |
| | Shoe Fitting Video |
| | Women's Clothing Sales |

702

| | |
|---|---|
| User Attribute Type | Gender ▼ |
| | Age |
| | Age Range |
| | Gender |
| | No User Attribute Filter |

704

| | |
|---|---|
| User Attribute Value | Female ▼ |
| | Female |
| | Male |

706

| | |
|---|---|
| Time | No Time Filter ▼ |
| | No Time Filter |
| | 8 AM – Noon |
| | Noon – 6 PM |
| | 6 PM – 10 PM |

708

| | |
|---|---|
| Relevance Weighting | 90 |

710

[ Create Association ] — 712

Figure 7

INTERACTIVE DISPLAY SYSTEM

CROSS-REFERENCE

This patent application claims the benefit of provisional patent application 61/427,753 entitled INTERACTIVE DISPLAY SYSTEM filed on Dec. 28, 2010;

this patent application claims the benefit of provisional patent application 61/427,755 entitled INTERACTIVE DISPLAY SYSTEM filed on Dec. 28, 2010;

this patent application claims the benefit of provisional patent application 61/454,664 entitled USER INTERFACE FOR GEOFENCE-ASSOCIATED CONTENT filed on Mar. 21, 2011;

this patent application claims the benefit of provisional patent application 61/472,054 entitled CONTENT RELEVANCE WEIGHTING SYSTEM filed on Apr. 5, 2011;

this patent application claims the benefit of provisional patent application 61/482,834 entitled CONTENT RELEVANCE WEIGHTING SYSTEM filed on May 5, 2011;

this patent application is a continuation-in-part of patent application Ser. No. 13/218,256 entitled SYSTEM AND METHOD FOR HANDSET POSITIONING WITH DYNAMICALLY UPDATED WI-FI FINGERPRINTING filed on Aug. 25, 2011 that claims the benefit of provisional patent application 61/376,936 filed on Aug. 25, 2010, provisional patent application 61/351,770 filed on Jun. 4, 2010, and provisional patent application 61/352,242 filed on Jun. 7, 2010;

this patent application is a continuation-in-part of patent application Ser. No. 13/153,214 entitled MERCHANT CONTROLLED PLATFORM SYSTEM AND METHOD filed on Jun. 3, 2011 that claims the benefit of provisional patent application 61/351,677 filed on Jun. 4, 2010, provisional patent application 61/351,770 filed on Jun. 4, 2010, and provisional patent application 61/352,242 filed on Jun. 7, 2010;

this patent application is a continuation-in-part of patent application Ser. No. 13/153,238 entitled MERCHANT CONTROL PLATFORM SYSTEM AND METHOD WITH LOCATION-BASED CONTENT DELIVERY filed on Jun. 3, 2011 now U.S. Pat. No. 9,408,032 that claims the benefit of provisional patent application 61/351,677 filed on Jun. 4, 2010, provisional patent application 61/351,770 filed on Jun. 4, 2010, and provisional patent application 61/352,242 filed on Jun. 7, 2010;

this patent application is a continuation-in-part of patent application of patent application Ser. No. 13/153,248 entitled LOCATION POSITIONING ENGINE SYSTEM AND METHOD filed on Jun. 3, 2011 that claims the benefit of the benefit of provisional patent application 61/351,677 filed on Jun. 4, 2010, provisional patent application 61/351,770 filed on Jun. 4, 2010, and provisional patent application 61/352,242 filed on Jun. 7, 2010;

this patent application is a continuation-in-part of patent application Ser. No. 12/821,852 entitled MOBILE AUTONOMOUS DYNAMIC GRAPHICAL USER INTERFACE APPLICATION FRAMEWORK filed on Jun. 23, 2010 now U.S. Pat. No. 8,738,024 that claims the benefit of provisional patent application 61/223,565 filed on Jul. 7, 2009;

this patent application is a continuation-in-part of patent application Ser. No. 12/413,547 entitled MOBILE AUTONOMOUS DYNAMIC GRAPHICAL USER INTERFACE filed on Mar. 28, 2009 now U.S. Pat. No. 8,942,995 that claims the benefit of provisional patent application 61/040,661 filed on Mar. 29, 2008;

this patent application is a continuation-in-part of patent application Ser. No. 11/948,007 titled PLAYER TRACKING USING A WIRELESS DEVICE FOR A CASINO PROPERTY filed on Nov. 30, 2007 now U.S. Pat. No. 9,373,116 that claims the benefit of provisional patent application 60/872,351 titled filed on Nov. 30, 2006; and the above patent applications hereby incorporated by reference in this patent application.

FIELD

The present invention relates to targeted delivery of content via a display. More particularly, the present invention relates to a system and method for delivering content to a display based on the location of a wireless device in proximity to the display.

BACKGROUND

Systems for delivering content from a network to a display are well known, for example, in the area of Internet Protocol Television (IPTV). It is desirable for a user to be able to use a readily available and familiar device, such as a wireless device belonging to the user, to control the content provided to the display. However, existing systems that allow a user to access content on a display with the user's wireless device require the user to configure a particular wireless handset to communicate with a particular display system. The configuration process may be complex and device specific. Moreover, multiple users may wish to access content on a particular display or a user may wish to access content on a variety of displays. Further, one or more users may wish to filter the content available on the display according to personal preferences.

Display systems may additionally be used to provide targeted content to users in the vicinity of the display. Existing systems for locating users proximate to a display are limited in that such systems require the display and wireless handset to be equipped with radio frequency identification (RFID) technology.

It would thus be desirable to have a display system capable of detecting the presence of a user in the vicinity of the display to allow the display to provide personalized content to the user.

SUMMARY

An interactive display system is described. The interactive display system comprises a display, a server and a wireless handset communicatively coupled to a wide area network. The system further comprises at least one transmitter configured to transmit a signal. The wireless handset is configured to receive a signal from the at least one transmitter and send signal strength information for the at least one transmitter to the server. The server is configured to determine whether the wireless handset is within a predefined viewing area of the display. The display is configured to present a content item when the wireless handset is within the predefined viewing area.

In another embodiment, the interactive display system comprises a means for determining whether the wireless handset is within a predefined viewing area of the display.

A method for presenting a content item on a display is also described. The method comprises receiving with a wireless handset a signal from at least one transmitter. The method further comprises sending from the wireless handset to a server signal strength information for the at least one transmitter. The server determines whether the wireless handset is within a predefined viewing area of the display. A content item is presented on the display when the wireless handset is within the predefined viewing area.

FIGURES

The present invention will be more fully understood by reference to the following drawings which are for illustrative, not limiting, purposes.

FIG. 7 shows an illustrative attribute filter interface.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure.

A position detection and display system for displaying content to a user detected in the vicinity of the display is described. A wireless handset is associated with a user through a user profile. One or more signal transmitters are located proximate to the display. When the user approaches the display, the user's wireless handset receives signals from the one or more signal transmitters. The wireless handset transmits information regarding the signals received from the signal transmitters to a server. The server determines the location of the handset relative to the display. If the wireless handset is determined to be within a predetermined distance of the display, the display receives instructions to display content associated with the user of the wireless handset.

The term display as used herein may refer to any device for displaying images on a surface. Typically, the display is a television or monitor. The display may be capable of showing still images, video, and text. The display may also reproduce audio. In some embodiments, the display is projected onto a surface such as a screen or a wall.

Figure 1:
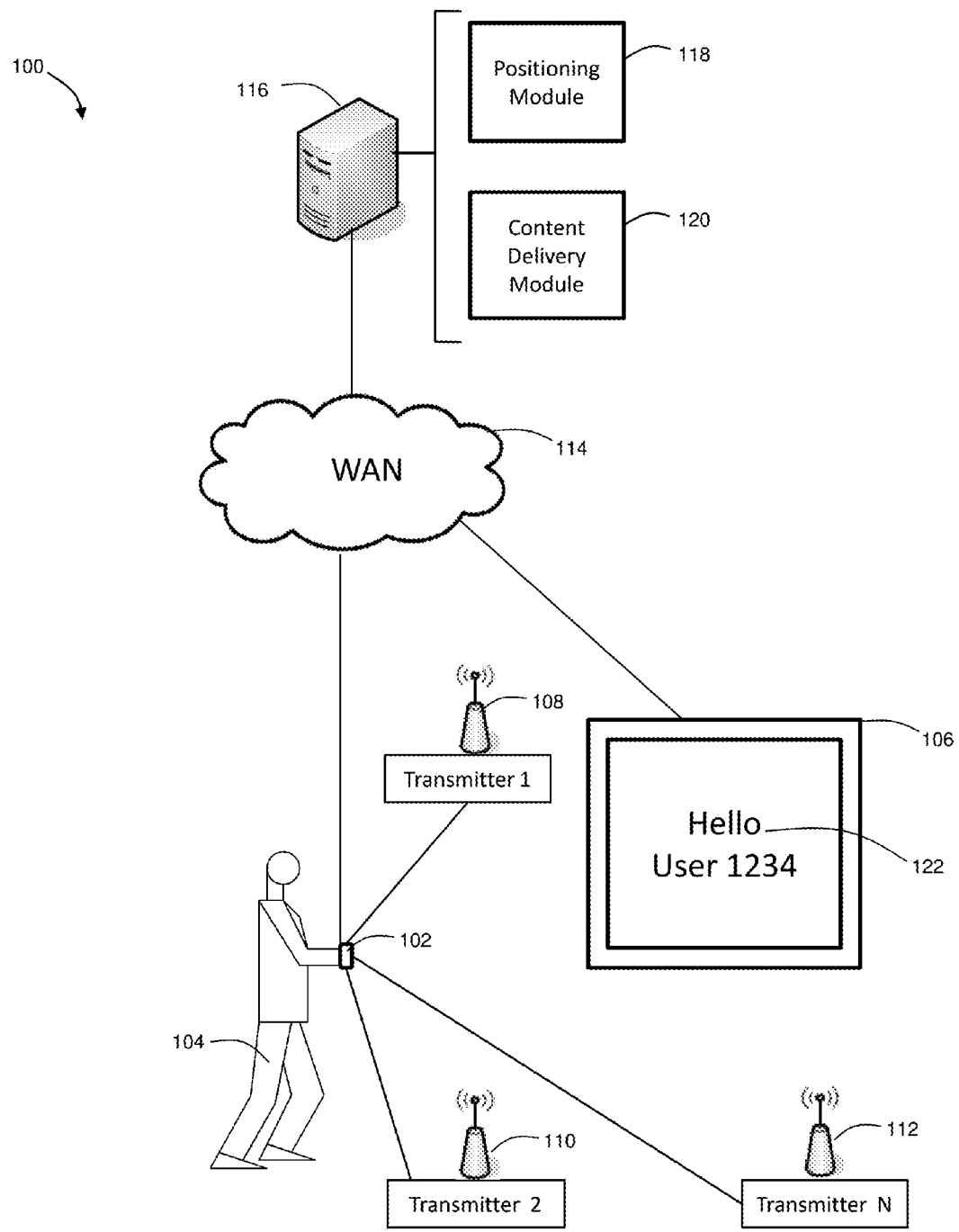
FIG. 1 shows an illustrative system architecture for a position detection and display system.

Referring to FIG. 1, a system diagram of a position detection and display system is shown. Wireless handset 102 is associated with user 104 through a user profile. The wireless handset may be a mobile handset, mobile phone, wireless phone, portable cell phone, cellular phone, portable phone, a personal digital assistant (PDA), a tablet, a portable media device, or any type of mobile terminal which is regularly carried by a user and has all the elements necessary for operation in a wireless communication system. The wireless communications include, by way of example and not of limitation, CDMA, WCDMA, GSM or UMTS or any other wireless communication system such as wireless local area network, WLAN, Wi-Fi or WiMAX. It shall be appreciated by those of ordinary skill in the art that the term wireless handset, mobile handset, wireless phone, and mobile phone are interchangeable.

The user 104 may create a user profile using the wireless handset 102 or an online interface accessed through another source such as a personal computer. The user profile comprises a unique identification for user 102. The user profile may comprise additional information such as the user's gender, age, residence information, content preferences, and interests. The user profile may be stored on wireless handset 102 or on a remote server.

Wireless handset 102 receives signals from one or more signal transmitters in the vicinity of display 106. The one or more signal transmitters are used to determine the location of wireless handset 102 relative to display 106. In FIG. 1, transmitters 108, 110, and 112 are indicated. Each transmitter emits a signal containing information identifying the transmitter. The transmitter may be, for example, an access point or femtocell.

Wireless handset 102 transmits to server 116 a signal profile comprising information regarding the signal strength and transmitter identification of the signals received from each signal transmitter detected by the wireless handset. An application running on server 116 may comprise a positioning module 118 and a content delivery module 120. The positioning module determines the location of the wireless handset relative to display 106 based on the signal profile received from the wireless handset. If the wireless handset is determined to be within a predefined viewing area of the display, also referred to as the active range of the display, the content delivery module transmits content instructions to display 106. The active range of the display may be defined as content bubbles within a geographic information system (GIS) as described below. In some embodiments, content is stored on server 116. The content delivery module may transmit content to display 106. Content 122 is shown on display 106 as indicated in FIG. 1. The content may comprise images, text, and video.

Figure 2:
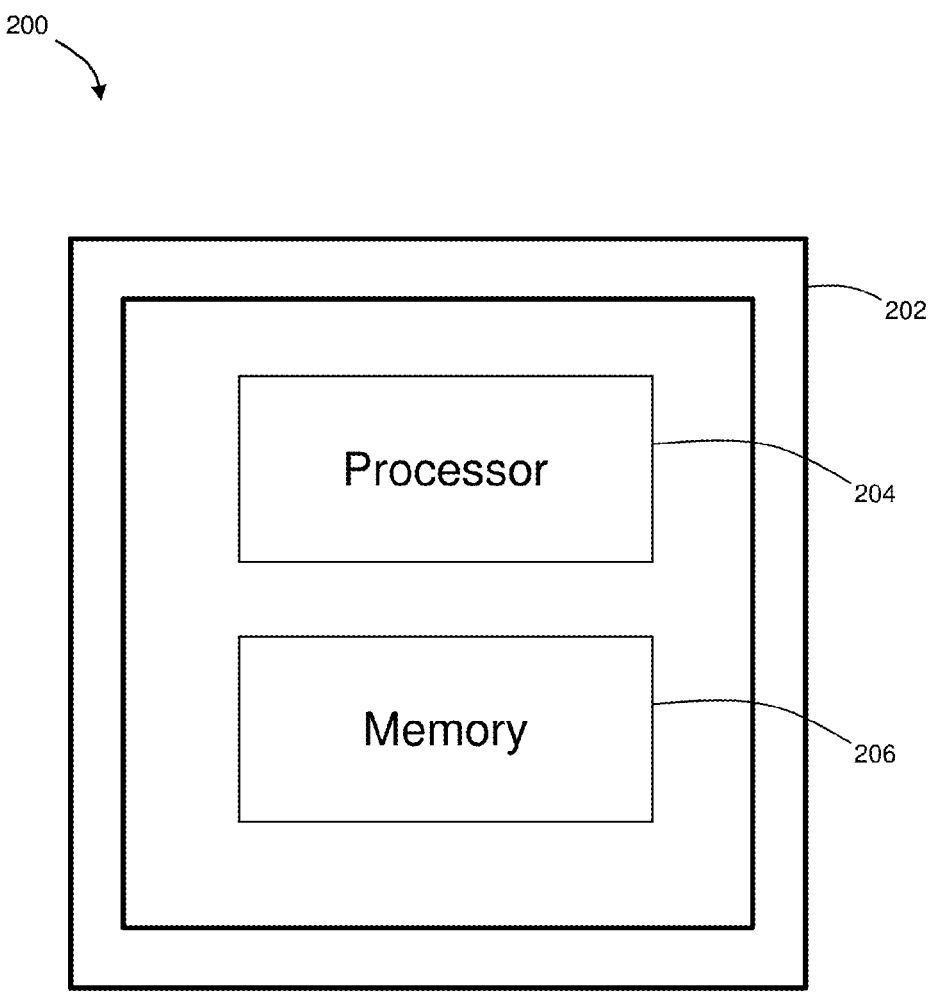
FIG. 2 shows an illustrative display with local content storage.

Referring now to FIG. 2, a display with local content storage 200 is shown. In some embodiments, the display 202 comprises a processor 204 and a memory 206. The memory may contain content. The display processor receives instructions from content delivery module 120. The instructions indicate which content stored in display memory 206 is to be shown on the display.

In another embodiment, the display receives an indication from positioning module 118 that a wireless handset 102 is within a predetermined range of the display 202. The display may also receive an indication of user information associated with the wireless handset. Processor 204 makes a determination of which content is to be shown and displays the content on display 202.

In some embodiments, when the wireless handset is determined to be within the active range of the display, the wireless handset makes a determination of which content is to be shown and the wireless handset sends an instruction to the display via the wireless network to display the content.

Content may be delivered to the display according to user preferences expressed through the user profile. In another embodiment, content is delivered according to a request for specific content expressed by the user through the wireless device.

According to an alternative embodiment, a content administrator defines content associations with one or more factors such as time, location, user age, user gender, user residence, and the user's transactional history with the content administrator's business. A weighting may be assigned to one or more of the factors in an algorithm used to determine which content is to be delivered to the user when the user is in the active range of the display. Below, an illustrative process a content administrator may use to establish the active range for a display is described. An illustrative process a content administrator may use to define content associations is also described. A content administrator may be any person having an interest in delivering content to a user, for example, a merchant or a casino manager.

Figure 3:
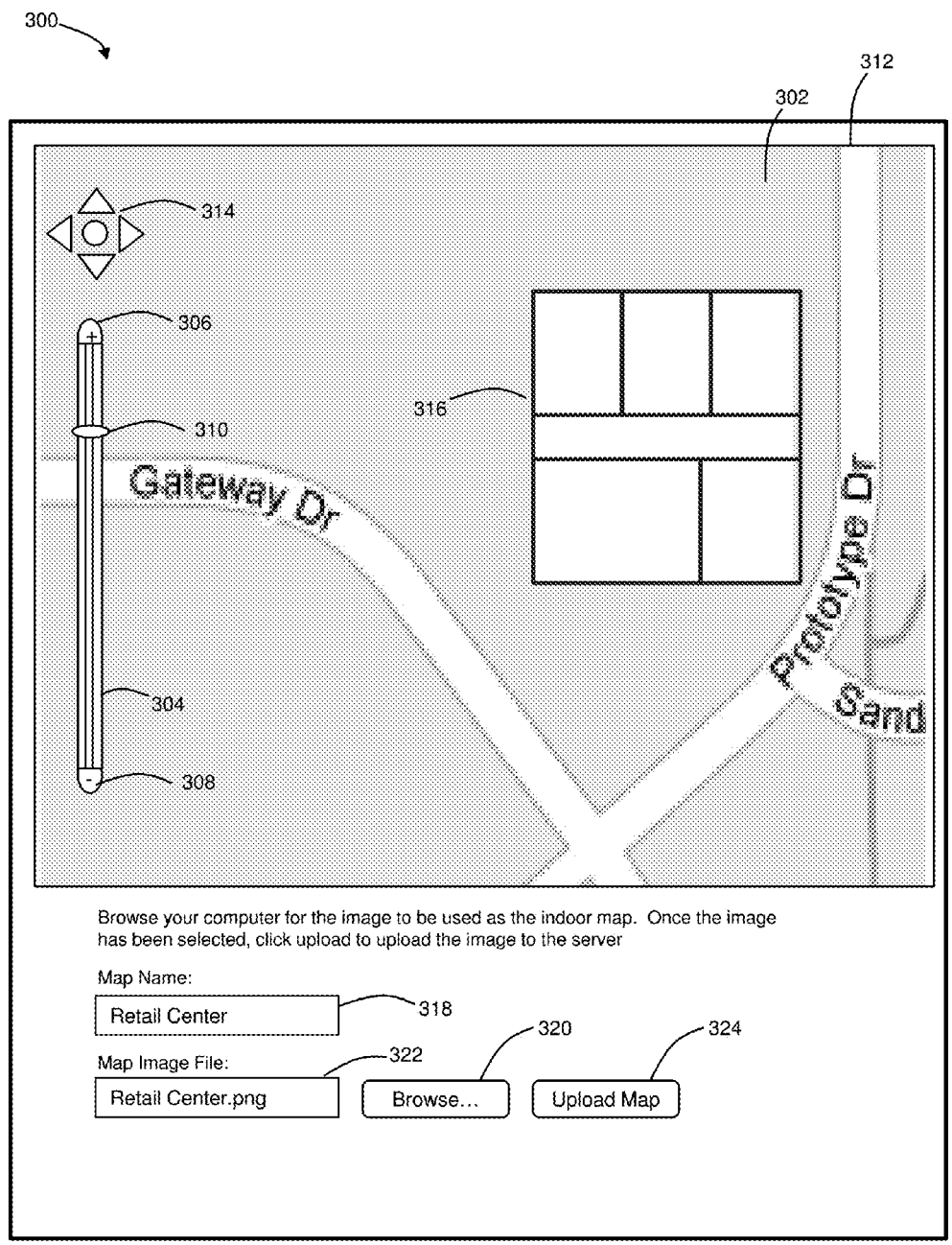
FIG. 3 shows an illustrative geographical information systems (GIS) interface.

Referring to FIG. 3, an illustrative GIS interface 300 is shown. A content administrator may indicate the location of a premises map relative to a street map using the GIS interface. The content administrator may use magnification bar 304 to adjust the magnification of street map 302 to the appropriate scale for placement of the premises map. Magnification bar 304 comprises increase magnification indicator 306, decrease magnification indicator 308, and sliding magnification control 310. The content administrator may slide the sliding magnification control 310 in the direction of the increase magnification indicator 306 to increase the level of magnification of the map and may slide the sliding magnification control 310 in the direction of the decrease magnification indicator 308 to reduce the level of magnification of the map. To change the position of the street map 302 within map window 312, navigation control 314 may be used. Navigation control 314 comprises an up arrow, a down arrow, a left arrow and a right arrow. To move the street map in the desired direction, the arrow pointing in the desired direction is mouse clicked. Navigation may additionally or alternatively be accomplished by mouse clicking on street map 302, holding down the mouse button, and moving the mouse to slide the map in the desired direction. It will be recognized that other methods for adjusting map magnification and map position within the map window may be used.

When the appropriate level of magnification has been reached, the content administrator may insert a merchant premises map image 316 over the street map and position the premises map relative to the street map. The content administrator may be prompted to enter a name for the premises map in a text box such as map name text box 318. The content administrator selects a map image file to insert over the street map. For example, the content administrator may click a Browse button 320 to open a dialog box allowing the content administrator to choose a map image file from a file directory. When an image file has been selected, the name of the image file may appear in a text box as shown at 322. The content administrator may then upload the selected map, for example, by hitting an upload map button 324. After the map is uploaded, it appears within map window 312. The premises map image 316 may be resized and rotated with mouse controls or other interface controls. The content administrator may place the premises map image 316 in the appropriate position relative to street map 302. For example, the content administrator may place the premises map image by mouse clicking on the premises map image, holding down the mouse button, and dragging the premises map image to the desired position. It will be recognized that other methods for selecting a map image and positioning it at a desired location on a street map may be used. The position of premises map 316 relative to street map 302 is stored, for example, on server 116. The level of magnification and position of street map 302 within map window 312 may also be stored. The image file or a string representing a path to the image file may also be stored. Additionally, the map name entered in text box 318 may be stored.

Figure 4:
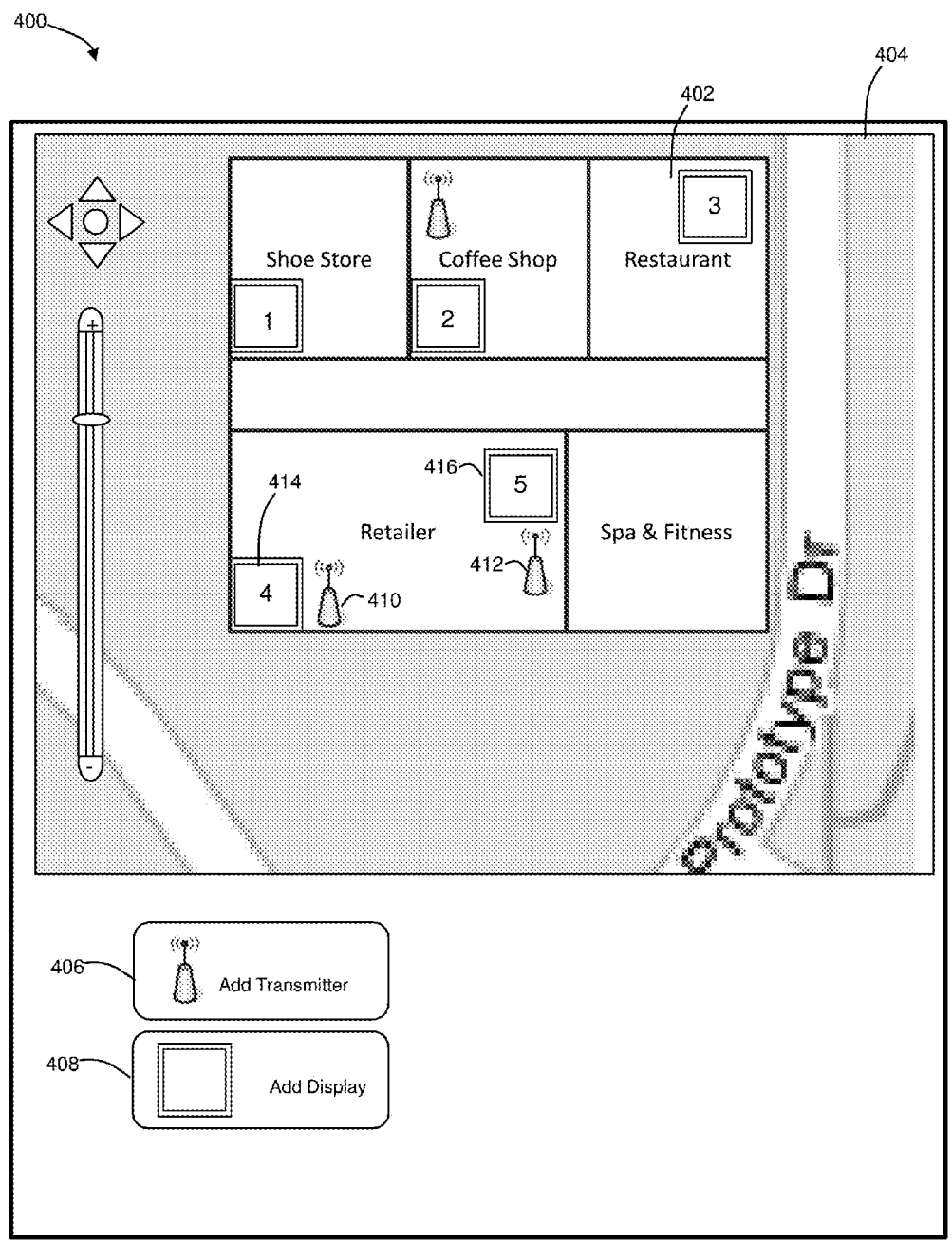
FIG. 4 shows an illustrative network object placement interface.

Referring to FIG. 4, an illustrative network object placement interface 400 is shown. The network object placement interface allows the content administrator to place network object icons on the merchant premises map to indicate the location of the network objects on the merchant premises. Network objects comprise signal transmitters and displays.

To add a transmitter icon to the premises map 402, the content administrator mouse clicks the transmitter icon button 406 and a transmitter icon appears in map window 404. The content administrator then drags the transmitter icon to the desired location on premises map 402. To add a display icon to the premises map, the content administrator mouse clicks the display icon 408 and a display icon appears in map window 404. The network object placement interface application may insert a number or other identifier over the display icon to provide an identification for the display. The content administrator then drags the display icon to the desired location on premises map 402. Several transmitters and displays have been placed on premises map 402 as shown in FIG. 4 according to the process described above. For example, transmitters 410 and 412 have been located in the portion of premises map 402 labeled "Retailer." Displays 414 and 416 have also been placed in the Retailer space and have been labeled by the application with the numbers 4 and 5, respectively. It will be recognized that a variety of other methods for indicating the location of network objects on a premises map in a graphical user interface may be used. The locations of any transmitters and displays placed on the map are stored on a server, for example server 116.

Figure 5:
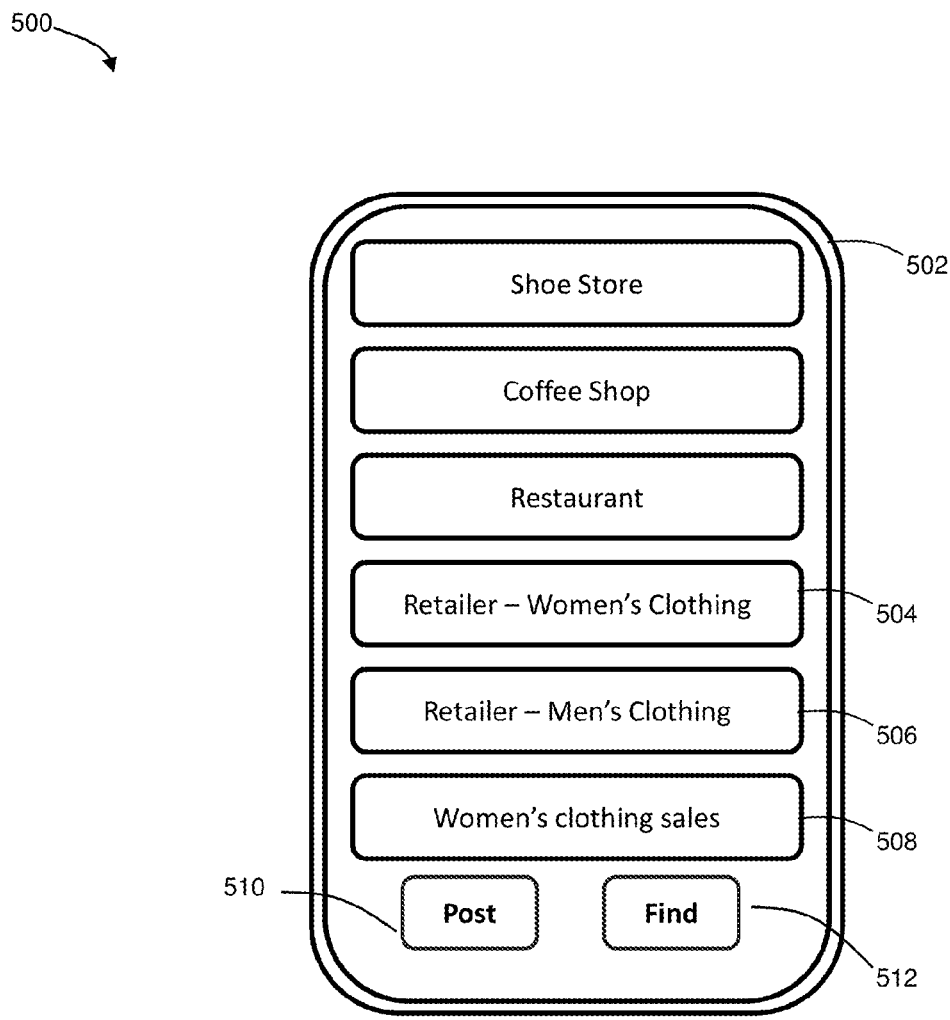
FIG. 5 shows an illustrative display selection interface.

In some embodiments, the wireless handset will provide the user with an interface listing some or all displays associated with a premises. Referring now to FIG. 5, an illustrative display selection interface on a wireless handset is shown. The display selection interface 500 shown on the display of wireless handset 502 comprises a list of all displays associated with the illustrative premises map as shown in FIG. 4. In some embodiments, the display selection interface will list all of the displays associated with the premises map using the GIS interface. In FIG. 5, the wireless handset is shown with buttons labeled "Shoe Store," "Coffee Shop," "Restaurant." "Retail-Women's Clothing," and "Retail-Men's Clothing," each button corresponding to a display shown in FIG. 4. For example, button 504, labeled "Retailer-Women's Clothing," corresponds to display 414, and button 506, labeled "Retailer-Men's Clothing" corresponds to display 416. If the user is located in the Women's Clothing section of the Retail space and is able to see display 414, the user may select button 504 to view content on display 414. The content provided to the display in response to the selection is typically content that is relevant to the products located in the merchant area in the vicinity in the display. For example, when a user selects button 504, the display will show information or promotions related to women's clothing located in the retail area.

The display selection interface may comprise one or more additional buttons to provide additional features to the user, such as coupons or information. Button 508 is an additional feature button indicating "Women's Clothing Sales." When the user selects this button, the wireless device display shows information related to the text shown on the additional feature button. For example, when a user selects button 508, the wireless device displays a list of sales on women's clothing in the Retail space shown in FIG. 4. When an additional features button is shown in the display selection interface, the text of the button may change depending on the signal profile received by the wireless handset. For example, if a user moves from a position in the vicinity of transmitter 410 to a position in the vicinity of transmitter 412, the text on button 508 may change from "Women's Clothing Sales" to Men's Clothing Sales."

The display selection interface may also comprise Post button 510 and Find button 512. When the user selects the post button, the user is prompted to enter content, such as text, an image, a photograph, or video. The post content is transmitted to a server, such as server 116, via wireless network 114 for storage. Additional post information such as user profile information, location, time, or additional information entered by the user may be transmitted to the server along with the post content. A database may be used to associate the additional post information with the post content. The post content may subsequently be transmitted from the server to a different user. For example, if a first user posts text regarding a product in a particular location, a second user may receive the text on a wireless handset when the second user is in the particular location. In an alternative embodiment, the post information may be displayed on a display in the particular location when the second user's wireless handset is within the active range of the display.

When Find button 512 is selected, the user is prompted to enter a search term. Information corresponding to the search term may be displayed on the user's wireless handset. In an alternative embodiment, information corresponding to the search term may be displayed on a display if the user's wireless handset is within the active range of the display.

In another embodiment, the display selection interface will list only some of the displays associated with a premises. For example, when the wireless device has detected some but not all of the transmitters on a premises, the display selection interface may list only those displays associated with the transmitters detected by the wireless device. Creation of associations between transmitters and displays is described in more detail in reference to FIG. 6.

Alternatively, the display selection interface may list only those displays associated with information or interests of the user as indicated in the user profile. For example, if the user is a male, the display selection interface may omit a listing of displays located in proximity to women's clothing. Creation of associations between displays and user-targeted content is described in more detail in reference to FIG. 6.

Figure 6:
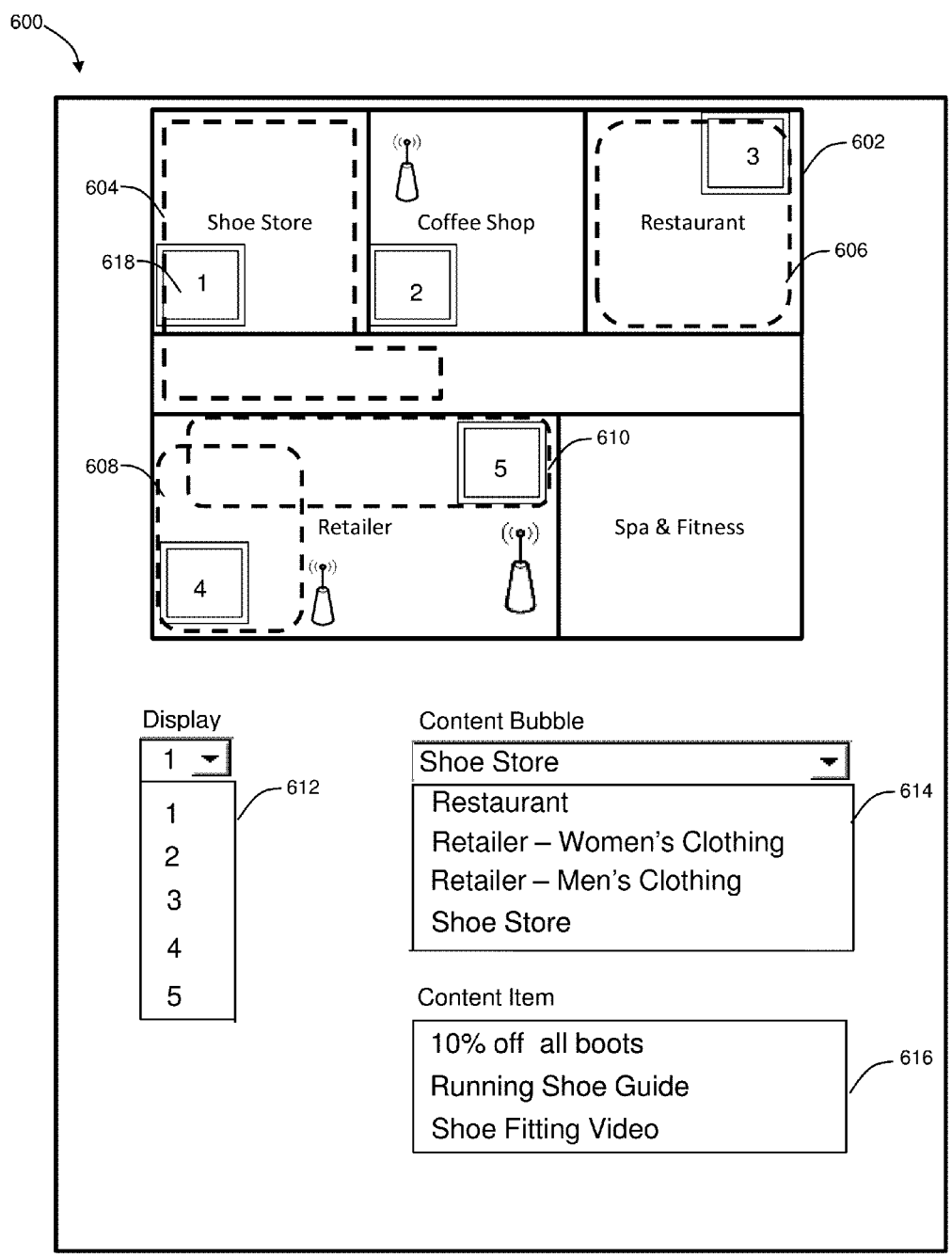
FIG. 6 shows an illustrative content bubble generation interface.

Referring now to FIG. 6, an illustrative content bubble interface 600 is shown. A content bubble is a virtual boundary indication inserted by a user on a premises map using a graphical user interface. A content administrator may then associate displays with the content bubbles. The content administrator provides a map 602, such as a premises floor plan, on which the content bubbles will be defined. The map may be provided by uploading an image file to the GIS interface as indicated in FIG. 3. The content administrator uses a shape drawing tool to define a content bubble. The shape drawing tool may allow the content administrator to create rectangles, polygons, or other shapes overlaid on the premises map. After a content bubble shape has been created, the content administrator may be prompted by the content bubble application to enter an identifier for the content bubble.

Content items may also be associated with the content bubbles. A content item may be text, images, video, audio, or any combination of these.

The content bubble interface comprises a display selection drop down menu 612, a content bubble selection drop down menu 614 and a content item selection drop down menu 616. To create an association between a display and a content bubble, the desired display and the desired content bubble are selected from the display selection drop down menu and the content bubble selection drop down menu, respectively. In FIG. 6, content bubbles 604, 606, 608 and 610 have been defined, corresponding to the Shoe Store, Restaurant, Retailer-Women's Clothing and Retailer-Men's Clothing, respectively. Display 1, as indicated at 618, has been selected from display selection drop down menu 612. Content bubble 604 corresponding to the Shoe Store area has been selected from content bubble menu 612. In this manner, an association has been created between display 618 and content bubble 604. In some embodiments, more than one content bubble may be associated with a display. A plurality of displays may be associated with a single content bubble.

One or more content items may be associated with a content bubble by selecting the desired content items from the content item selection drop down menu when the desired content bubble is selected from the content bubble selection drop down menu. The content items "10% off all boots" and "Running Shoe Guide" have been selected from content item menu 616. In this manner, a content item boundary association has been created between these content items and the Shoe Store content bubble, indicated at 604.

Referring to FIG. 7, an illustrative attribute filter interface 700 for associating a content item with one or more attribute filters to create content item profile associations is shown. The attribute filter interface allows the content administrator to restrict the delivery of content items to displays based on information such as user profile data and time of day. For example, in FIG. 6, the content administrator associated the content item "Running Shoe Guide" with the display 1, located in the Shoe Store. The content administrator may wish to display the Running Shoe Guide to only those users between the ages of 18-50. The content administrator may use the tools of the attribute filter interface to indicate that the "Running Shoe Guide" content item is only to be displayed on the display located in the Shoe Store if the user entering the Shoe Store content bubble is between the ages of 18-50.

The content administrator selects a content item from a predefined list of content menu items as shown in the drop down menu 702. In the illustrative example shown in FIG. 7, the content administrator has chosen the content item "Women's Clothing Sales."

The content administrator may subsequently choose a user attribute to associate with the content item using user attribute type drop down menu 704 and user attribute value drop down menu 706. At menu 704, the content administrator has chosen user attribute type "Gender." The content administration application subsequently populates user attribute value drop down menu 706 with the attribute values associated with the user attribute type specified in drop down menu 704.

If the user attribute type is a range, such as an age range, the attribute value menu may be presented in a format to allow entry of the values bounding the range. For example, the user attribute menu may be presented as a pair of text entry boxes that allow the content administrator to enter a minimum age and a maximum age.

Menu 706 has been populated with the user attribute values "Female" and "Male," which are the user attribute values associated with user attribute type "Gender." In menu 706, the content administrator has selected the attribute value "Female" to associate with the selected content item "Women's Clothing Sales." As a result, the content item "Women's Clothing Sales" will only be displayed to those users whose user profiles indicate that the user is a female. When a female user is within a content bubble defining the active range for a display with which the content item "Women's Clothing Sales" has been associated, the display shows the content item "Women's Clothing Sales."

The content administrator may wish to distribute a content item to all users. This may be accomplished by selecting "No User Attribute Filter" from the user attribute type menu.

The content administrator may also specify a time to associate with the content item, thereby creating a content item time association. Menu 708 allows the content administrator to indicate that the content item is to be displayed only during a particular period of time. For example, an advertisement pertaining to coffee may be shown only during the time range 8 AM-Noon. The "No Time Filter" option has been selected from menu 708. As a result, the content item "Women's Clothing Sales" will be shown to female users at all times.

The time ranges shown in menu 708 are merely illustrative and it will be recognized that other time ranges could be implemented. In some embodiments, the content administrator may specify alternative measures of time, such as a range of dates or specified days of the week. The time menu may allow a content administrator to designate times or dates bounding a range. For example, the time menu may be presented in a format, such as a pair of text entry boxes, that allows the content administrator to enter a starting time and an ending time.

In some embodiments, the content administrator may associate content items with other or additional attributes. An example is merchant specific attributes, which are attributes associated with a user that were not specified by the user. For example, a merchant specific attribute may comprise information from the user's transactional history with the merchant.

The content administrator may assign an initial relevance value to the content-attribute association created in tables 702-708. The initial relevance value may be a numerical value on a scale, such as a number falling in the range of 1-100, with 1 indicating minimum relevance and 100 indicating maximum relevance. As shown in 710, the content administrator has chosen an initial relevance weighting value of 90. As an example, the content item "Women's Clothing Sales" may be considered to be highly relevant to females, but less relevant to males. If a content administrator intends for both females and males to be able to view the content item, but wishes to assign a lower priority to displaying the content item if the viewer is a male, the content administrator may assign a high relevance value to the association between the content item and the user attribute value "Male" and a low relevance value to the association between the content item and the user attribute value "Female."

In some embodiments, the content administrator is able to associate additional filters with the content item user attribute association. The content administrator may wish to alter the content served to a user based on time, date, or user location. For example, a coupon for coffee may be delivered to a user having a user attribute indicating a preference for coffee during the morning hours. Content may be filtered by user location based on information provided by the user to the content administrator regarding the user's location. In some embodiments, the content administrator may associate a content item with a time, date, location, or other filter without associating the content item with a user attribute. In some embodiments, the content administrator may be able to provide content items to all users, by not specifying user attribute attribution or other filter for the content items.

When the content administrator has completed entry of the attribute filters to be associated with a content item, the content administrator selects "Create Association" button 712 to store the association. The association may be stored on a server such as server 116. Preferably, the associations are stored in a database to facilitate rapid filtering and searching.

Figure 8:
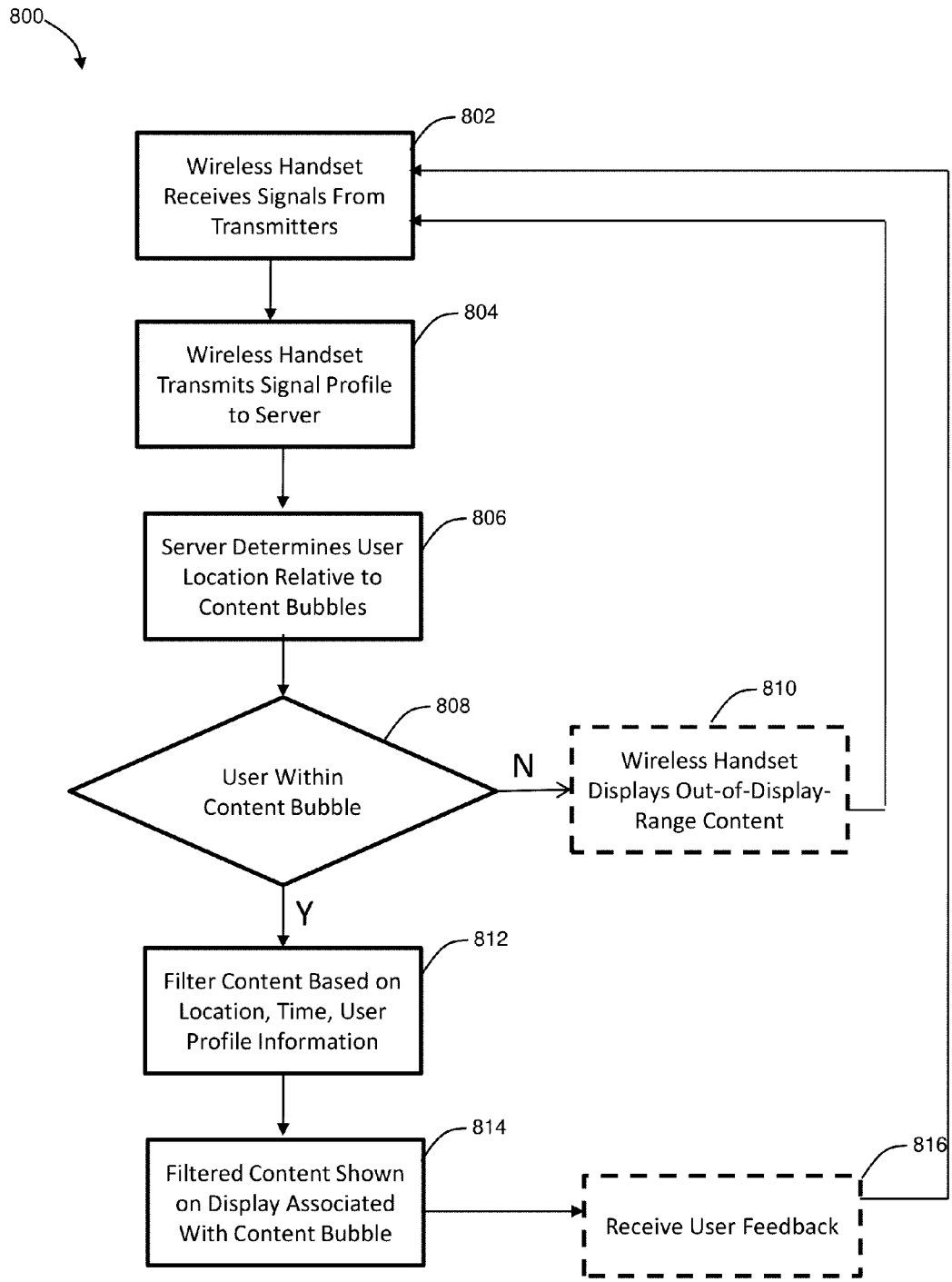
FIG. 8 shows an illustrative flow chart for delivering content to a display.

Referring now to FIG. 8, a method for delivering content to a display is shown. The method begins at block 802, in which wireless handset 102 receives signals from system transmitters. The method continues to block 804, in which the wireless handset transmits a signal profile comprising signal strength and identifying information for the signal received from each transmitter detected by the wireless handset. At block 806, positioning module 118 on server 116 determines the location of the user relative to the content bubbles defined as shown in FIG. 6. The method proceeds to decision diamond 808, at which it is determined whether the user is located within a content bubble. If the user is not within a content bubble, the method proceeds to optional block 810. At optional block 810, out-of-display-range content is provided to the display on the user's wireless handset. The out-of-display-range content may comprise a message that the handset is beyond the range of any displays on the premises, content items filtered by time and user profile information but not location, or default content. If optional block 810 is omitted, the method proceeds to block 802.

If the user is determined to be within a content bubble, content delivery module 120 determines which content to show on the display or displays associated with the content bubble, as indicated at block 812. Content may be filtered according to one or more of location (association between a content item and a content bubble), time, and user profile information. Additional filters may be used. The method proceeds to block 814, at which the filtered content resulting from block 812 is shown on the display associated with the content bubble within which the user is located. At optional block 816, the user provides feedback on the content shown on the display. For example, the user may be presented with the opportunity to give an indication of approval or disapproval, such as "thumbs up" and "thumbs down" icons which the user may select. In another embodiment, the user is prompted to rank the content on a numerical scale. The user feedback may be used to adjust initial relevance value 710 assigned to a content item association as shown in FIG. 7. If optional block 816 is omitted, the method proceeds to block 802.

Figure 9A:
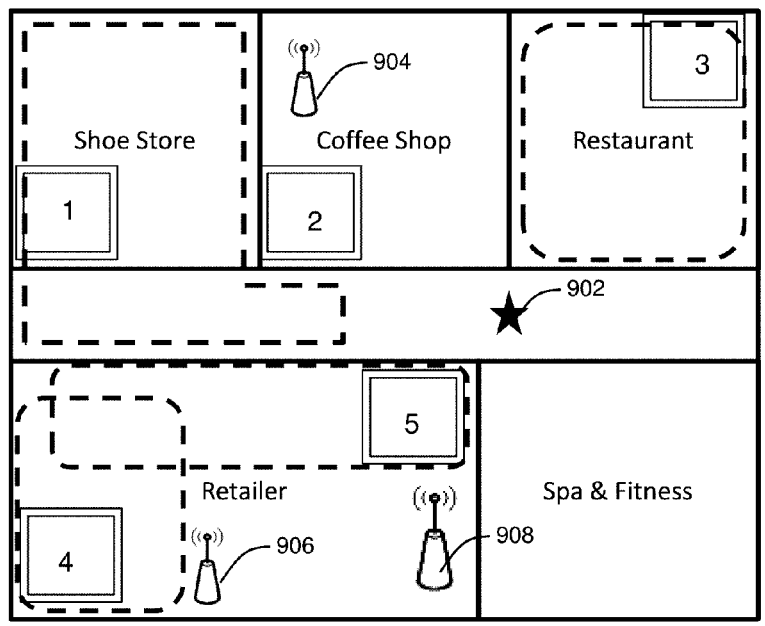
FIGS. 9A-9B show an illustrative graphical user interface on a user's wireless handset corresponding to a first illustrative user location.
Figure 9B:
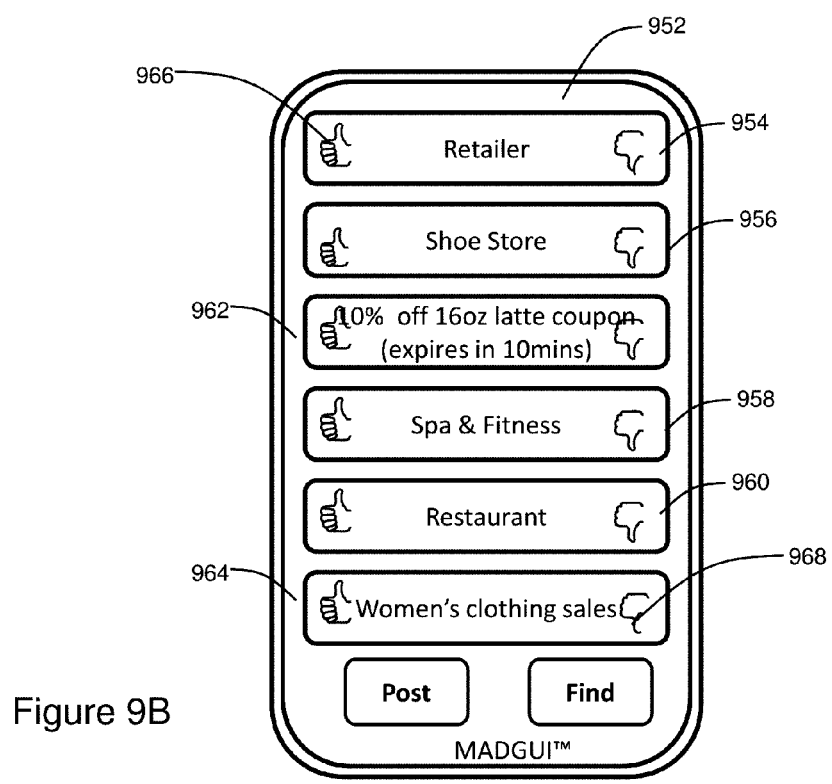

Referring to FIGS. 9A-9B, an illustrative graphical user interface (GUI) corresponding to a first illustrative user location is shown. The GUI may also be referred to as a Mobile Autonomous Dynamic Graphical User Interface (MADGUI). In FIG. 9A, a user is located at a first user position indicated by star 902. The user's wireless handset receives signals from transmitters 904, 906 and 908, however, the signal profile received by the handset indicates that the user is not located in any of the content bubbles. Accordingly, as indicated at block 810 of the method shown in FIG. 8, the user receives out-of-display-range content on the wireless handset. The out-of-display-range content is shown in the illustrative MADGUI 952 indicated in FIG. 9B. The out-of-display-range content may be default content provided to any user out of range of the premises displays, or may be targeted content filtered according to the user's profile information, time, and other filters. The user has the option of selecting buttons 954-960 corresponding to the Retailer, Shoe Store, Spa & Fitness center, and Restaurant, respectively. Each of these content items may be a link to other content, such as text, images, video, audio, or a combination of these pertaining to the respective merchant. The linked content is shown on the handset display when the button is pressed. The user is also presented with a coupon 962 for "10% off 16 oz latte" and informational item 964, "Women's clothing sales."

The user also has the option of providing feedback on each content item shown in the MADGUI, by selecting the "thumbs up" (e.g., 966) or "thumbs down" (e.g., 968) icon proximate to the appropriate content item.

In some embodiments, filtered content items are delivered to and displayed on the wireless handset. The user may select a content item on the wireless handset GUI to display content on a display associated with a content bubble occupied by the user. The user may also provide feedback on the content shown on the display using the wireless handset interface.

Figure 10A:
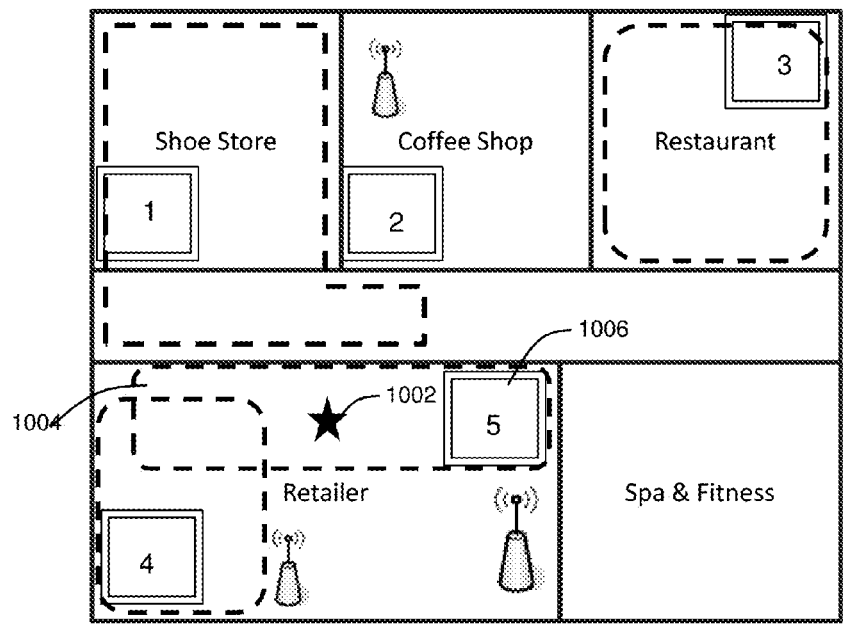
FIGS. 10A-10B show an illustrative graphical user interface on a user's wireless handset corresponding to a second illustrative user location.
Figure 10B:
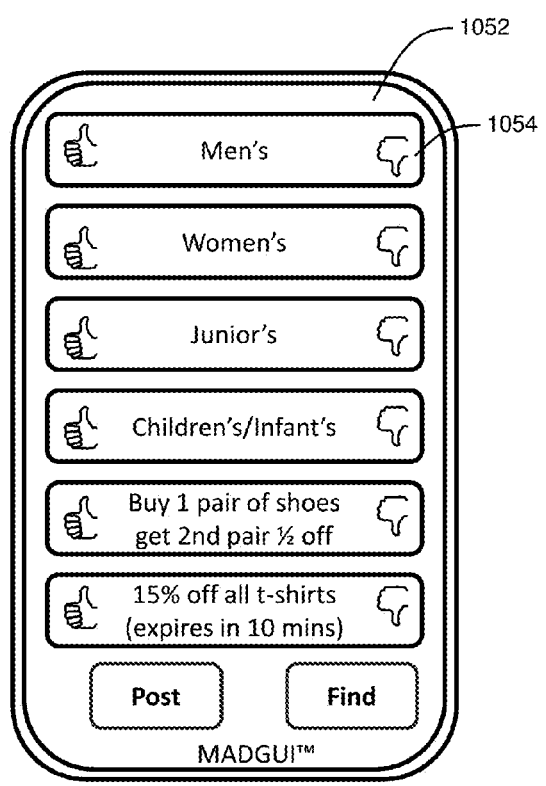

Referring to FIGS. 10A-10B, an illustrative graphical user interface (GUI) corresponding to a second illustrative user location is shown. In FIG. 10A, a user is located at second user position indicated by star 1002. The signal profile received by the user's wireless handset indicates that the user is located within content bubble 1004. The wireless handset GUI 1052 is populated with content item links associated with one or more of the following, according to filtering and relevance weighting: content bubble 1004, time, user profile information, and other filter associations. When the user selects a button from the GUI, the content item corresponding to the button is shown on the display associated with the content bubble occupied by the user. Thus, if the user selects button 1054 from GUI 1052, display 5 (shown at 1006) will display the content for content item "Men's."

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. An interactive display system, comprising:
   a stationary display communicatively coupled to a network;
   a content delivery module communicatively coupled to the network;
   a positioning module determines a position of a wireless device of a user;
   a geographic information system allows a content administrator to define one or more geofences within a map, the stationary display positioned within the map;
   the geographic information system allows the content administrator to associate the one or more geofences with one or more stationary displays located within the map using a graphical user interface;
   the stationary display presents a content item when the wireless device is within the geofence associated with the stationary display;
   the content delivery module communicates one or more content items to the wireless device over the network, wherein the one or more content items are displayed on the wireless device and enable the user of the wireless device to make a user interface selection corresponding to a content item selected among the one or more content items;
   wherein the content delivery module receives over the network the user interface selection from the wireless device, wherein the content delivery module transmits an instruction over the network to the stationary display to display a content item associated with the user interface selection; and
   the stationary display receives the instruction from the content delivery module, wherein the instruction causes the stationary display to display the content item associated with the user interface selection.

2. The interactive display system of claim 1, wherein the stationary display further comprises:
   a display processor that receives at least one instruction from the content delivery module;
   a display memory that stores content; and
   wherein the display processor presents content from the display memory on the display according to instructions received from the content delivery module.

3. The interactive display system of claim 1 wherein the geographic information system allows the content administrator to indicate locations for the one or more stationary displays on the map using the graphical user interface.

4. The interactive display system of claim 1, wherein the content delivery module receives a plurality of associations between a plurality of content items and the one or more geofences;
   the content delivery module filters the plurality of content items according to a geofence in which the wireless device is located; and
   the content delivery module communicates the plurality of filtered content items to the wireless device.

5. The interactive display system of claim 4 wherein the filtered content items are presented on a user interface disposed on the wireless device.

6. The interactive display system of claim 1, wherein the content delivery module receives a plurality of content item profile associations, wherein each content item profile association is an association between a content item and a user profile;
   the content delivery module filters the plurality of content items according to a user profile associated with a user of the wireless device; and
   the content delivery module communicates the filtered content items to the wireless device.

7. The interactive display system of claim 1, wherein the one or more content items communicated to the wireless device are associated with one or more stationary displays in the vicinity of the wireless device.

8. The interactive display system of claim 1, wherein the content delivery module receives a plurality of content item time associations, wherein each content item time association is an association between a content item and a time range;
   the content delivery module filters the plurality of content items according to a current time; and
   the content delivery module communicates the plurality of filtered content items to the wireless device.

9. An interactive display system, comprising:
   a stationary display configured to communicate with a network;
   a content delivery module configured to communicate with the network;
   at least one transmitter configured to transmit a signal;

a positioning module configured to receive a signal strength information from a wireless device of a user, the wireless device receiving the signal strength information from the at least one transmitter;

the positioning module configured to determine the location of the wireless device based on the signal strength information;

a geographic information system configured to allow a content administrator to define one or more geofences within a map;

the geographic information system further configured to allow the content administrator to associate the one or more geofences with one or more stationary displays located within the map using a graphical user interface;

a content delivery module configured to communicate a user interface to the wireless device, the user interface populated with at least one content item based on the location of the wireless device, wherein the user interface allows the user of the wireless device to select a content item resulting in a user interface selection;

the content delivery module configured to receive over the network the user interface selection from the wireless device;

the content delivery module configured to communicate an instruction to the stationary display over the network to display a content item associated with the user interface selection; and the stationary display configured to receive the instruction from the content delivery module over the network, wherein the instruction causes the stationary display to display the content item associated with the user interface selection when the wireless device is within the geofence associated with the stationary display.

10. The interactive display system of claim 9, wherein the stationary display further comprises:

a display processor configured to receive instructions from the content delivery module;

a display memory configured to store content; and wherein the display processor presents content from the display memory on the display according to instructions received from the content delivery module.

11. The interactive display system of claim 9, wherein the geographic information system is further configured to:

allow the content administrator to indicate locations for the one or more stationary displays on the map using the graphical user interface.

12. The interactive display system of claim 9, wherein the content delivery module is further configured to:

receive a plurality of content item geofence associations, wherein each content item geofence association is an association between a content item and a geofence;

filter the plurality of content items according to the geofence in which the wireless handset is located; and communicate the plurality of filtered content items to the wireless device.

13. The interactive display system of claim 9, wherein the geographic information system is further configured to allow the content administrator to upload the map to the geographic information system.

14. The interactive display system of claim 9, wherein the content delivery module is further configured to:

receive a plurality of content item profile associations, wherein each content item profile association is an association between a content item and a user profile;

filter the plurality of content items according to a user profile associated with a user of the wireless device; and communicate the filtered content items to the wireless device.

15. The interactive display system of claim 14, wherein a relevance weight value is associated with each content item profile association, the content delivery module configured to further filter the plurality of content items according to the relevance weight value.

16. The interactive display system of claim 9, wherein the content delivery module is further configured to:

receive a plurality of content item time associations, wherein each content item time association is an association between a content item and a time range;

filter the plurality of content items according to a current time; and communicate the plurality of filtered content items to the wireless device.

17. A method for presenting a content item on a display, the method comprising:

receiving with a positioning module a signal strength information from a wireless device, the wireless device receiving the signal strength information from at least one transmitter;

allowing a content administrator to define one or more geofences within a map with a geographic information system;

allowing the content administrator to associate the one or more geofences with one or more stationary displays located within the map with a graphical user interface of the geographic information system;

determining with a positioning module whether the wireless device is within a geofence associated with the display;

presenting a content item on the display when the wireless handset is within the geofence;

communicating from the content delivery module to the wireless device one or more content items, wherein the one or more content items enable the user of the wireless device to make a user interface selection corresponding to a content item selected among the one or more content items;

receiving with the content delivery module from the wireless device the user interface selection corresponding to the content item selected on the wireless device;

communicating from the content delivery module to the display an instruction to display a content item associated with the user interface selection; and presenting on the display the content item associated with the user interface selection in response to receiving the instruction over the network.

18. The method of claim 17, further comprising:

receiving with a display processor instructions from the content delivery module;

storing content with a display memory; and presenting with the display processor content from the display memory according to instructions.

19. The method of claim 17, further comprising enabling the content administrator to indicate a location for the one or more stationary displays on the map with the graphical user interface of the geographic information system.

20. The method of claim 17, wherein the content delivery module is further configured to:

receive a plurality of content item boundary associations, wherein each content item boundary association is an association between a content item and a geofence;

filter the plurality of content items according to the geofence in which the wireless device is located; and communicating the filtered content items to the wireless device.

21. The method of claim 17, further comprising:

receiving a plurality of content item profile associations, wherein each content item profile association is an association between a content item and a user profile; and filtering the plurality of content items according to a user profile associated with a user of the wireless device;

and communicating the filtered content items to the wireless device.

22. The method of claim 17, further comprising:

receiving a plurality of content item time associations, wherein each content item time association is an association between a content item and a time range;

filtering the plurality of content items according to a current time; and communicating the plurality of filtered content items to the wireless device.

\* \* \* \* \*